United States Patent
Baley

(10) Patent No.: US 6,474,851 B1
(45) Date of Patent: Nov. 5, 2002

(54) FISHING LIGHTING SYSTEM, COMPONENTS THEREFOR AND METHODS OF MAKING THE SAME

(76) Inventor: David Baley, 827 W. Webster, Springfield, MO (US) 65802

( * ) Notice: Subject to any disclaimer, the term of this patent is extended or adjusted under 35 U.S.C. 154(b) by 0 days.

(21) Appl. No.: 09/808,834

(22) Filed: Mar. 14, 2001

Related U.S. Application Data

(60) Provisional application No. 60/211,726, filed on Jun. 15, 2000.

(51) Int. Cl.[7] .............................................. B63B 45/02
(52) U.S. Cl. ....................... 362/477; 362/231; 362/219; 340/985; 114/255
(58) Field of Search ................................ 362/477, 125, 362/152, 217, 219, 222, 223, 224, 225, 227, 236, 255, 231, 251, 184; 340/984, 985; 114/255

(56) References Cited

U.S. PATENT DOCUMENTS

| | | | |
|---|---|---|---|
| 3,331,958 A | 7/1967 | Adler | |
| 3,955,078 A | 5/1976 | Eggers et al. | 362/222 |
| D264,251 S | 5/1982 | Lin | |
| 4,404,619 A * | 9/1983 | Ferguson | 362/222 |
| D279,820 S | 7/1985 | Yuen | |
| D299,550 S | 1/1989 | Payne | D26/42 |
| D306,768 S | 3/1990 | Yuen | |
| 4,947,293 A | 8/1990 | Johnson et al. | 362/555 |
| 4,954,931 A | 9/1990 | Hassler, Jr. | 362/485 |
| 5,495,401 A | 2/1996 | Evans | 362/477 |
| 6,174,078 B1 * | 1/2001 | Ohm et al. | 114/343 |

* cited by examiner

Primary Examiner—Sandra O'Shea
Assistant Examiner—Hargobind S. Sawhney
(74) Attorney, Agent, or Firm—Richard L. Marsh

(57) ABSTRACT

A fishing lighting system comprising at least one lighting assembly wherein the lighting assembly comprises at least one ultraviolet light source, at least one white light source, a controller for controlling the ultraviolet light source and the white light source and a mounting base. The mounting base carries the ultraviolet light source, the white light source and the controller. The fishing lighting system is preferably made integral with a portion of the gunwale of a boat.

19 Claims, 4 Drawing Sheets

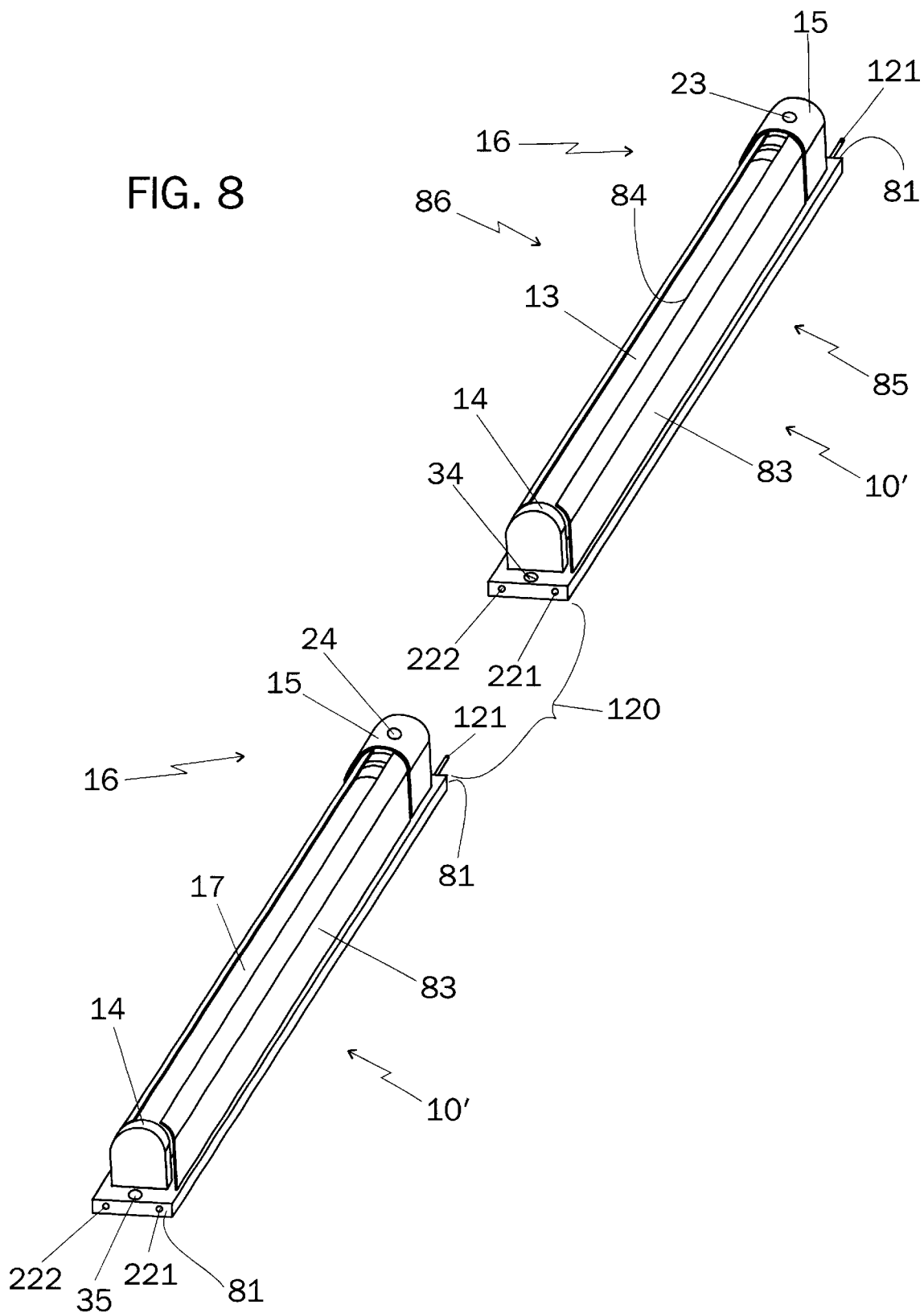

FISHING LIGHTING SYSTEM, COMPONENTS THEREFOR AND METHODS OF MAKING THE SAME

CROSS REFERENCE TO RELATED APPLICATION

This application is a non-provisional application under 35 U.S.C. 111 (a) of provisional application Serial No. 60/211,726 filed Jun. 15, 2000.

BACKGROUND OF THE INVENTION

1. Field of the Invention

This invention relates to a fishing light usable at night for attracting fish while also enabling the fisherperson to observe the direction of a fluorescent fishing line. An ultraviolet light is provided for attracting fish wherein the ultraviolet light also illuminates the fluorescent fishing line. A white light may also be provided to further attract fish and to assist the fisherperson in landing a hooked fish.

2. Prior Art Statement

It is known to provide a fishing light which is removably mounted to a trunnion mount on the gunwale of a boat wherein one bulb is an elongated "fishing light" connected to a rheostat for changing the brightness while the other light is a dual filament spot light. The filaments of these bulbs are mutually exclusive, that is, only one can be used at any given time. For instance, see the U.S. Pat. No. 3,955,078 issued on May 4, 1976 to Eggers, et al.

It is also known to provide fishing light mounted to a gunwale of a boat by suction cups. For instance, see the U.S. Design Pat. No. 299,550 issued on Jan. 24, 1989 to Duncan M. Payne. A separate shield mounted to the top of the light is now required to keep the light from shining in the face of fisherpersons using this light.

It is further known to provide a lighting strip mounted in the bumper guard for the boat to provide for the ship's directional lighting. The strips require 250 volts AC power normally not available on a fishing boat thus requiring a separate power source. For instance, see U.S. Pat. No. 4,495,401 issued on Feb. 27, 1996 to Graham P. Evans.

It is further known to provide a cargo vehicle perimeter clearance lighting system including an elongated core light conducting strip clad about its cross section with a translucent material layer having an index of refraction different from that of the core material to produce a light guide. The lighting strip is illuminated by a light source having light focusing reflectors to end-illuminate the light guide. For instance, see the U.S. Pat. No. 4,947,293 issued on Aug. 7, 1990 to Johnson, et al.

William L. Hassler, Jr., in his U.S. Pat. 4,954,931 issued Sep. 04, 1990 claims a light source for producing a relatively uniform dispersed light emission along a length of a light bar, the bar comprising a prism made of polycarbonate having one frosted face and having a Light Emitting Diode lighting source in at least one end thereof.

SUMMARY OF THE INVENTION

There is a need for a fishing lighting system that is disposed in a location wherein damage to the fishing lighting system is substantially prevented and wherein the fishing lighting system is not in the way of the fisherperson. Therefore, it is an object of this invention to provide a fishing lighting system comprising at least one ultraviolet light source and at least one white light source wherein the fishing lighting system is integral with a protective strip of a boat gunwale.

Specifically, it is an object of this invention to provide a fishing lighting system comprising at least one lighting assembly wherein the lighting assembly comprises at least one ultraviolet light source, at least one white light source, means for separately controlling the ultraviolet light source and the white light source and a mounting base, the mounting base carrying the ultraviolet light source, the white light source and the means for separately controlling wherein the fishing lighting system is integral with a portion of the gunwale of a boat.

Another specific object of this invention is to provide a fishing lighting system comprising at least one ultraviolet light source wherein the fishing lighting system is integral with a protective strip of a boat gunwale and wherein the light source is directed away from the gunwale of the boat and thus a separate shield is not needed to keep the ultraviolet light out of the eyes of fisherpersons using the fishing lighting system.

Yet another object of this invention is to provide a night fishing lighting system integral with a protective strip of a boat gunwale wherein the fishing lighting system has means to illuminate a fluorescent fishing line.

A feature of this invention is to provide a lighting assembly associated with a portion of the gunwale of a boat which is disposed in a protective encasement, the protective encasement having protruding flanges snap-fitted into companion grooves in a base member channel of the protective strip of the gunwale over the lighting assembly.

Another feature of this invention is to provide a mounting base of a lighting assembly, the base attached to a base member channel of the protective strip of the gunwale wherein the lighting assembly has a cover fitted thereover, the cover snap-fitted into companion grooves in a base member of the protective strip of the gunwale.

Yet another important feature of this invention is to provide fishing lighting system comprising at least one lighting assembly wherein the lighting assembly comprises at least one ultraviolet light source, at least one white light source, means for separately controlling the ultraviolet light source and the white light source and a mounting base, the lighting assemblies of the fishing lighting system having a protective encasement or cover wherein the cover has a transparent portion and an opaque portion and wherein the transparent portion directs light emanating from the lighting assembly substantially downwardly and/or in a narrow strip directly outwardly from the gunwale.

It is a further object of this invention to provide a fishing lighting system mounted within a channel on the edge of a boat gunwale.

A significant object of this invention is to provide a fishing lighting system comprising at least one lighting assembly wherein the lighting assembly comprises at least one ultraviolet light source, at least one white light source and a mounting base wherein the fishing lighting system replaces a section of a base member channel and a protective strip fitted onto the base member channel, the protective strip base member channel and the protective strip removed from a gunwale of a boat and wherein the fishing lighting system replaces only a minor portion of the length of the base member channel and the protective strip.

It is yet another object of this invention to provide a fishing lighting system adjacent a fishing location of a fishing boat.

It is still another object of this invention to provide a fishing lighting system powered by an energy source utilized by a fishing boat.

Additionally, it is an object of this invention to provide a fishing lighting system which is protected from damage by fisherpersons.

A further object of this invention to provide a fishing lighting system which is protected from damage by flotsam and/or by dockside mooring.

Still another object of this invention is to provide a night fishing lighting system integral with a protective strip of a boat gunwale wherein the fishing lighting system has means to illuminate an area adjacent the boat gunwale to assist in landing a hooked fish.

Another significant object of this invention is to provide a fishing lighting system adaptable to an edge channel of a gunwale of various fishing boats.

Yet another significant object of this invention is to provide a fishing lighting system for attracting fish toward a fishing boat having the fishing lighting system mounted thereon.

Still another object of this invention is to provide a fishing lighting system removably mounted within an edge channel of the gunwale of a fishing boat wherein maintenance may be performed upon the fishing lighting system by removing the fishing lighting system from the edge channel.

An extra object of this invention is to provide a fishing lighting system having portions of a cover thereof opaque and portions transparent or translucent to direct the light emanating from the fishing lighting system as desired by the user of the fishing lighting system.

An auxiliary object of this invention is to provide a fishing lighting system having means to operate one or several components of the fishing lighting system.

Another significant object of this invention is to provide a sealing means for a fishing lighting system.

Yet another object of this invention is to provide a fishing lighting system comprising at least one light source wherein the fishing lighting system is integral with a portion of the gunwale of a boat and/or wherein components of a lighting assembly are directly connected to the gunwale.

Still another object of this invention is to provide a fishing lighting system comprising at least one light source wherein the fishing lighting system is integral with a portion of the gunwale of a boat wherein the at least one light source is releasably electrically coupled to at least one other light source.

Yet another feature of this invention is to provide a fishing lighting system comprising at least one light source wherein the fishing lighting system is a removable, self-contained unit having a power source, a switching means, a light bulb, bulb sockets, integrated power circuit, mounting plate and cover.

Yet another feature of this invention is to provide a fishing lighting system wherein lamp receiving sockets are directly affixed to the gunwale of a boat, the fishing lighting system so provided also having a separable cover associated therewith.

Finally, it is an object of this invention to provide a fishing lighting system mounted with and comprising a minor portion of the length of a protective strip in the edge channel of a fishing boat.

BRIEF DESCRIPTION OF THE DRAWINGS

FIG. 8 is a perspective view of an alternate embodiment of the fishing lighting system of this invention comprising separate modular lighting units to be electrically interconnected at mating ends.

DESCRIPTION OF THE PREFERRED EMBODIMENTS

While the various features of this invention are hereinafter described and illustrated as a fishing lighting system usable at night for attracting fish while also enabling the fisherperson to observe the direction of a fluorescent fishing line wherein an ultraviolet light is provided for attracting fish and also illuminates the fluorescent fishing line, it is to be understood that the various features of this invention can be used singly or in various combinations thereof to provide a fishing lighting system for night fishing as can hereinafter be appreciated from a reading of the following description.

Figure 1:
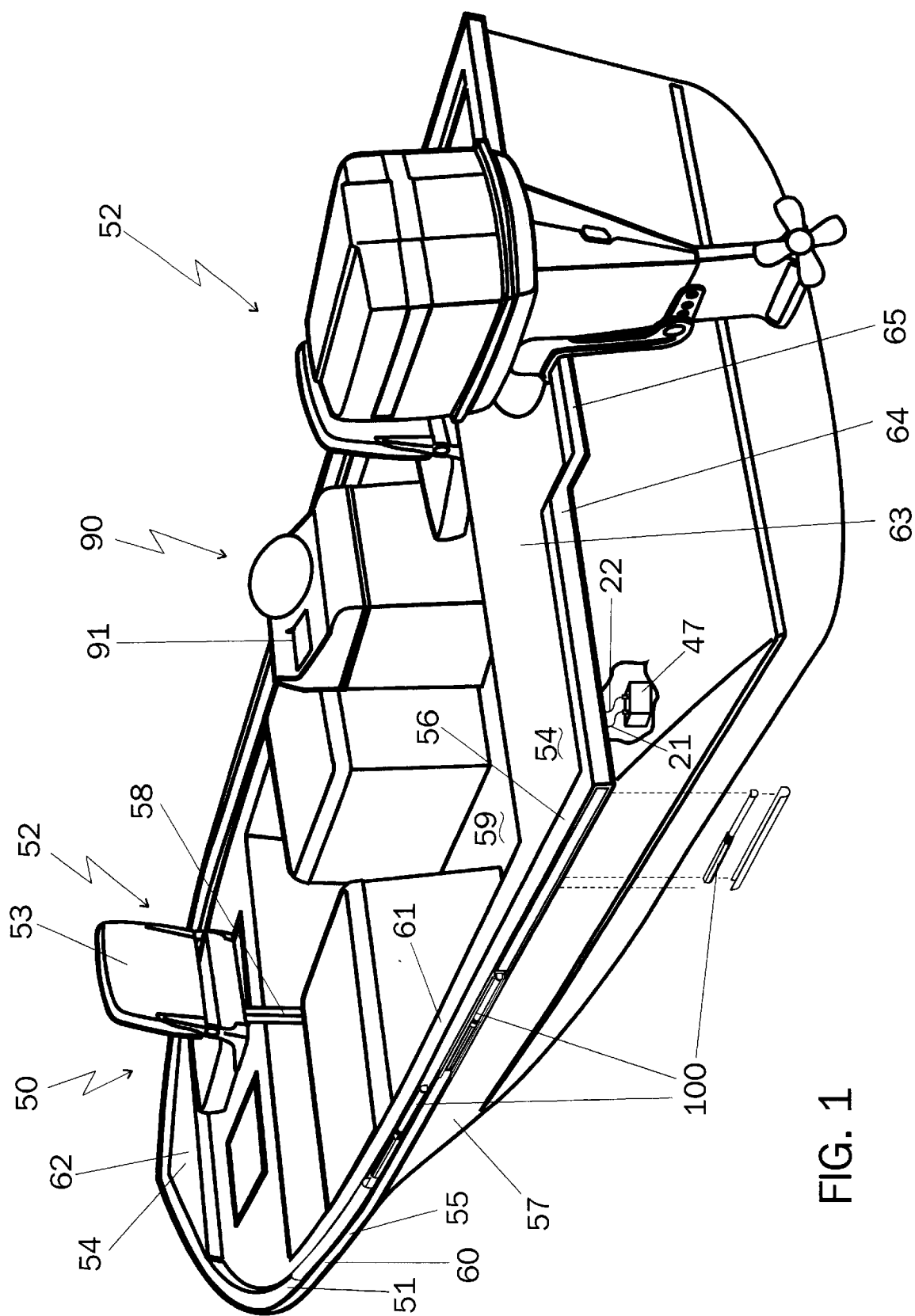
FIG. 1 is a right top perspective view of a fishing boat utilizing the fishing light system of the preferred embodiment of this invention.

Referring now to FIG. 1, a fishing boat generally shown by the numeral 50 comprises a hull portion 57 and a deck portion 54, deck portion 54 joined to hull portion 57 at a gunwale 51. Deck portion 54 further has multiple fishing locations 52 thereupon, fishing locations 52 generally comprising a seat 53 mounted upon a pedestal 58 wherein seat 53 is adapted to rotate about pedestal 58 giving a fisherperson seated upon seat 53 rotatably ready access for fishing in different directions without departing from seat 53. Deck portion 54 may further have a control area 59 generally depressed into hull 57 wherein control area 59 is adapted to provide access to the controls 90 of boat 50 for moving from one fishing area to another. Control area 59 may have fishing locations 52 associated therewith such that fishing from control area 59 is permissible. Gunwale 51 has a gunwale edge 55 which generally has a channel 56 affixed thereto, channel 56 receiving a protective strip 60 therein to protect gunwale 51 from damage when docking boat 50 alongside a dock or when placing boat 50 on a trailer for transportation behind a motor vehicle. Protective strip 60 is generally an elastomeric material having resilient characteristics, protective strip 60 having a protruding portion with lip portions extending from the edges thereof for mounting within edge channel 56. Protective strip 60 is manufactured in several widths for mounting in the various widths of edge channel 56. Though edge channel 56 is herein described as being substantially contiguous with an edge of deck 54, generally edge channel 56 with protective strip 60 is disposed at the widest portion of hull 57 and may therefore be spaced from deck 54 either above or below. Thus, it is understood that the fishing lighting system 100 of the instant invention may be employed in an edge channel 56 as dictated by the location of edge channel 56, however, fishing lighting system 100 may also mounted under or on top of a protruding portion of boat hull 57 such as under or on top of a protruding gunwale as shown in FIG. 1.

Typically, fisherpersons utilize various lights for attracting fish as have been described in the aforementioned prior art references. One such light is an ultraviolet light or "black light" mounted in a box wherein the box has suction cups affixed to at least one surface thereof The box may then be removably affixed to top 61 of gunwale 51 however, these black light boxes are generally in the way of the fisherperson and are subject to being damaged or dismounted by movement of the fisherperson or movement of boat 50 through the water. In the preferred embodiment of this invention, the fishing lighting system 100 of FIG. 1 comprises a lighting assembly generally shown in FIG. 2 with the numeral 10, a protective channel generally shown in FIG. 3 with the numeral 11, a cover 30 for channel 11 generally shown in FIG. 4 and end plugs 12 for each end of channel 11 as also shown in FIG. 3. Lighting assembly 10 is adapted to be fitted into edge channel 56 of gunwale 51 and affixed thereto in a water tight manner to create fishing lighting system 100 as will become readily apparent hereinafter. Though the preferred embodiment of fishing lighting system 100 is herein described as fitted into edge channel 56 of gunwale 51 as shown amidships at control area 59, it is to be fully understood that fishing lighting system 100 may be associated with gunwale 51 in any combination of locations, for instance, wherein gunwale 51 protrudes slightly from hull 57, at least one lighting assembly 10 may be mounted under gunwale 51 as shown near stern portion 63. Likewise, at least one lighting assembly 10 may be fixedly mounted on a topside surface of gunwale 51 as shown near bow portion 62. Furthermore, it is understood that fishing lighting system 100 may comprise a combination of lighting assemblies 10 mounted at or near each of fishing locations 52.

Figure 4:
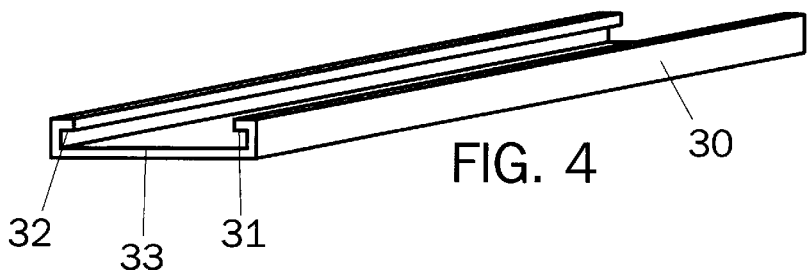
FIG. 4 is a right top frontal perspective view of lens cover for the protective channel of the preferred embodiment of FIG. 2.

Referring specifically to FIG. 4, transparent or translucent cover 30 is a shallow U-shaped length of material having inwardly turned side flanges 31, each side flange 31 having an engaging lip 32 formed on an inside surface thereof for engaging channel flanges 18 of protective channel 11. Thus, transparent or translucent cover 30 is adapted to be snap-fitted over channel flanges 18 of protective cover 11 permitting light to pass through transparent or translucent cover 30 onto or toward the surface being fished. As both white light and black light easily pass through transparent or translucent cover 30, white light 37 may be utilized for the purposes desired by the fisherperson, including by not limited to, landing a fish alongside boat 50, docking, etc. Likewise, black light 37 may be used to attract fish toward boat 50 and/or to observe the location and direction of a fluorescent line used by the fisherperson.

Figure 2:
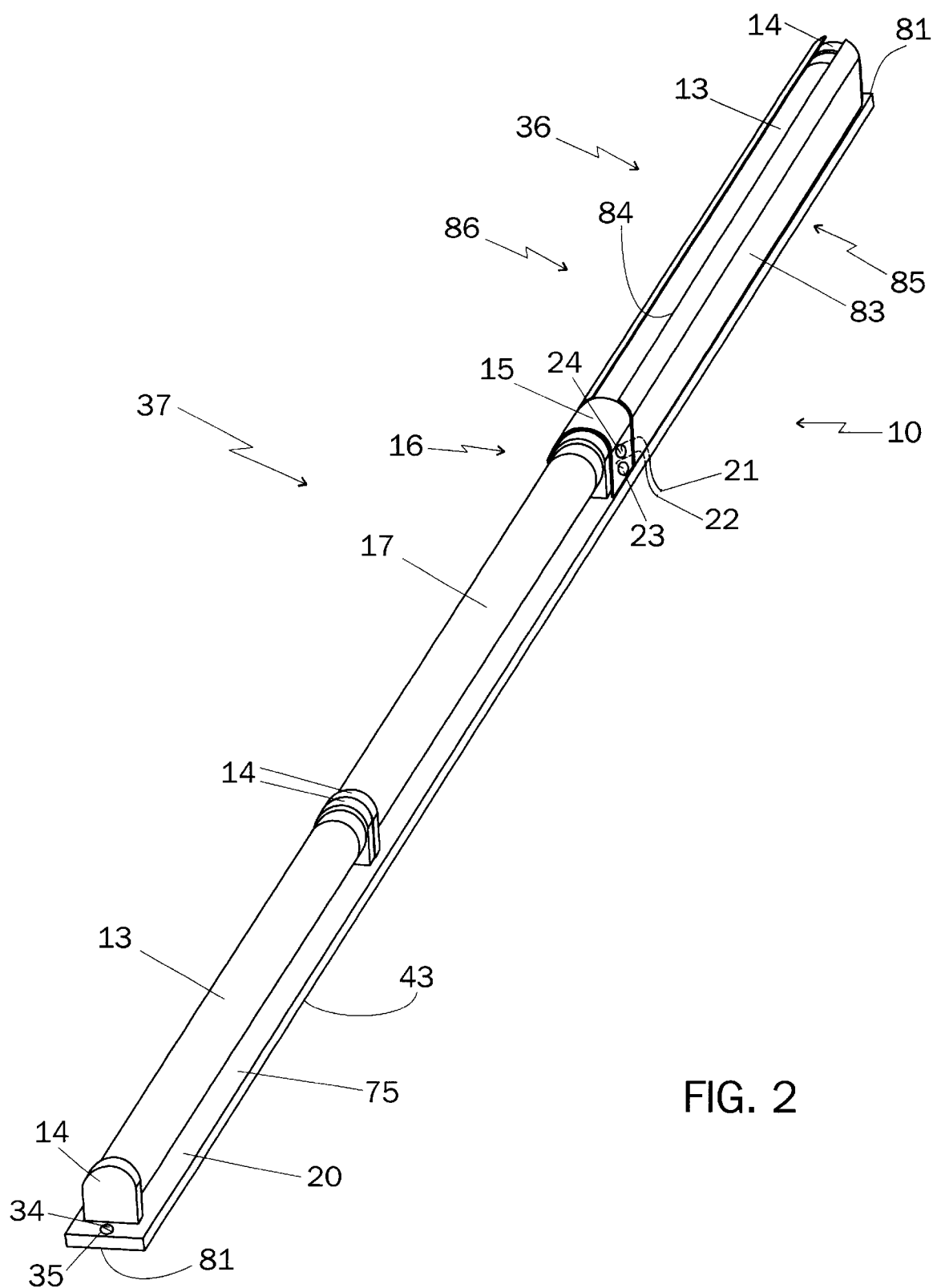
FIG. 2 is a right top frontal perspective view of the preferred embodiment of the fishing lighting system of this invention removed from a protective cover.
Figure 3:
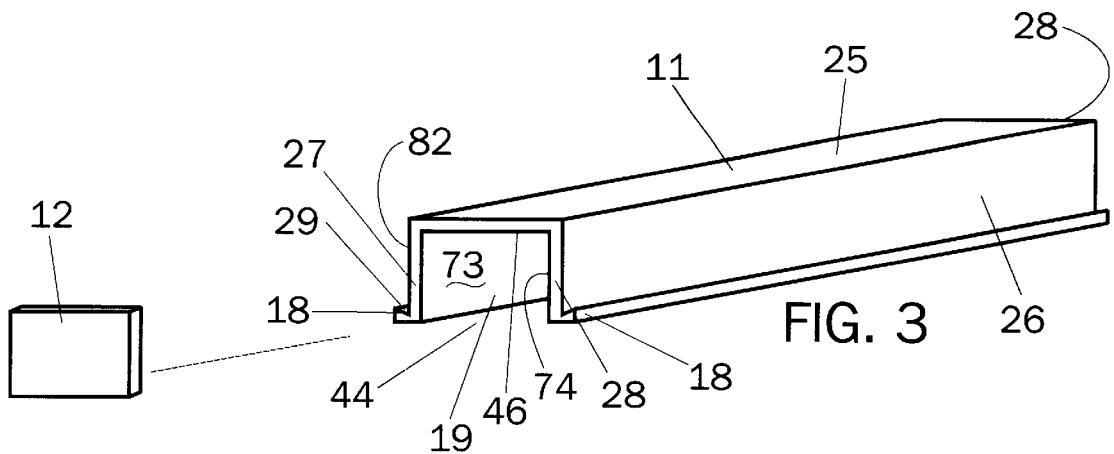
FIG. 3 is a right top frontal perspective view of the preferred protective channel adapted for mounting the fishing lighting system of the preferred embodiment of FIG. 2 upon a fishing craft.

Referring now to FIG. 2, lighting assembly 10 comprises a base 20 for affixing to edge channel 56. Base 20 may be separately made of an elongated strip of material having screw holes 35 passing therethrough wherein screw holes 35 are adapted to receive a screw 34 therein for directly affixing base 20 to edge channel 56 or to edge 55 of gunwale 51, however, in the preferred embodiment, base 20 is disposed on closed side 25 of channel 11 in FIG. 3, sides 26 and 27 removed from base 20 in FIG. 2 for clarity. Base 20 is generally slightly less than the width of the narrowest edge channel 56 utilized on fishing boats however, base 20 may be custom made for each width of edge channel 56 and be removably disposed in grooves in channel 56 without departing from the scope of this invention. At least one ultraviolet light source 36 is affixed to base 20, ultraviolet light 36 having a means for controlling associated therewith for switching ultraviolet light 36 on and off as desired by the fisherperson. Thus, base 20 has at least one control 16 mounted in a control carrier 15 wherein control carrier 15 is carried by base 20. Preferably, base 20 has two ultraviolet lights 36, one ultraviolet light 36 mounted adjacent each end 81 of base 20 wherein ultraviolet lights 36 are separated by a white light 37 and control carrier 15. Ultraviolet light 36 comprises means 14 for receiving and a bulb 13, bulb 13 generally of the gas filled tube type conventionally adapted for mounting between two substantially identical but opposite facing means 14 for receiving wherein prongs from the gas filled tube bulb 13 are slidably mounted in receiving slots in sockets of means 14 for receiving as is well known in the art. Though means 14 for receiving is shown in the accompanying figures as conventional slotted sockets, means 14 for receiving may be different on each end and may comprise touch pads for the ends of the prongs extending from bulb 13 and the grounding sleeve surrounding bulb 13. White light 37 may be of the incandescent type comprising a bulb 17 as shown fitted into a screw or bayonet type socket but preferably is also of the gas filled tube type fitted into means 14 for receiving as utilized for ultraviolet light 36. Of course, if desired, the fisherperson could replace one or both of ultraviolet light tubes 13 with white light fluorescent bulbs and/or replace bulb 17 with an ultraviolet bulb without departing from the scope of this invention. White light 37 is controlled by a switch 24 of control 16 while at least one ultraviolet light 36 is controlled by switch 23 of control 16. Control 16 is shown in FIG. 2 as comprising two separate switches 23 and 24, one each for white light 37 and ultraviolet light 36, however, control 16 may comprise as many switches 23, 24 as lights 36, 37 are mounted on base 20 or control 16 may comprise only one switch having multiple poles and switching positions for controlling light 36, 37 in the number of configurations desired by the fisherperson. Control 16 may also comprise a plurality of switches 23, 24 or alternately may be a circuit board having a plurality of functions wherein lighting of one or more lights 36, 37 may be effected. Furthermore, control 16 may have brightness, pulsating, sequencing or testing functions programmed therein, control 16 controlling these functions individually or in various combinations thereof. Finally, though control 16 is shown disposed between ultraviolet lights 36, control 16 may be disposed on either end of base 20, may comprise base 20 or may be disposed separate from base 20 such as on control panel 91 or adjacent at least one of fishing locations 52.

Base 20 is generally about 36 inches in length and approximately one inch in width such that two separate ultraviolet lights 36 of approximately 15 inches may be mounted on base 20 yet still leaving room for mounting of control carrier 15 and a four inch long tube type white light 37. When mounting lighting assembly 10 to boat 50, a section of protective strip 61 at least as long as base 20 is removed from edge channel 56. Base 20 is then screwed onto the exposed base of edge channel 56 where the section of protective strip 61 has been removed. Referring again to FIG. 1, one lighting assembly 10 of fishing lighting system 100 is shown as mounted in edge channel 56 substantially amidships alongside control area 59 where gunwale edge 55 is substantially straight. Though lighting assembly 10 is shown as mounted on the port side of boat 50 at or near control area 59, fishing lighting system 100 may additionally comprise another lighting assembly mounted on the starboard side at or near control area 59. Likewise, lighting assemblies 10 of fishing lighting system 100 may also be mounted on a bow portion 62 and/or stern portion 63 of gunwale 51 and/or on stern 64 of boat 50. Though it is usually sufficient to have one lighting assembly 10 mounted on each side of boat 50 approximately amidships, more than one lighting assembly 10 may be affixed to edge channel 56 on either or both sides of boat 50 as desired by the fisherperson.

Lighting assembly 10 must be connected to an energy source in order to properly operate and thus it is desired to have connecting wires 21, 22 from control 16 pass through base 20 and lie along the back side surface 43 of base 20 extending fully along edge channel 56 underneath the remaining portion of protective strip 60 until connecting wires 21, 22 exit an end of edge channel 56 at or near the center 65 of stern 64. Connecting wires 21, 22 may then be passed into hull 57 and affixed to an energy source such as a battery 47 shown in the broken away portion of deck 54 in FIG. 1. It is not necessary to provide a separate energy source for lighting assembly 10 as a battery 47 generally utilized for a trolling motor has sufficient reserves to operate both the trolling motor and bulbs 13, 17 as bulbs 13, 17 draw a minimum amount of power. Thus, lighting assembly 10 may be directly connected to the battery 47 utilized for providing power to the lighting circuits of boat 50 or to the battery for a trolling motor. Though it is preferred that the connecting wires 21, 22 be passed along edge channel 56 to stern 64, it is also contemplated that the connecting wires 21, 22 could be passed directly through gunwale 51 into hull 57 and connected to an energy source, such as a cigar lighter, at or near the location of lighting assembly 10 or alternately connected to another energy source such as the energy source utilized for power to the electrical systems of boat 50. Likewise, it is contemplated that lighting assembly 10 may have control 16 separated from base 20 and connected to an energy source wherein control 16 is remotely controlled. A variable rheostat may be wired into lighting circuit wire 21, 22 for varying the intensity of light emanating from bulbs 36, 37. Furthermore, the above description recites a single pair of wires extending from the energy source to fishing lighting system 100 however, at least one wire may be installed from the energy source to each bulb 36, 37 and wired to a variable rheostat for individual control of brightness of bulb 36, 37. In an alternate embodiment, lighting assembly 10 may carry a set of batteries onboard base 20 wherein lighting assembly 10 is a fully self contained unit comprising base 20, cover 30, means 14 for receiving, bulbs 13, 17, control 16, end plugs 12 and batteries (not shown). Finally, though it is preferred that. base 20 and channel 11 be separately formed, it is certainly within the scope of this invention to produce channel 11 with base 20 integrally formed as closed side 25.

Preferably, where base 25 carries base 20 of lighting assembly 10 thereon and is affixed to edge channel 56, base 25 is an opaque material and may further have face 75 thereof be reflective to reflect light from bulbs 13, 17 away from face 75. An opaque filter 83 may also be formed along with base 20 and be disposed upwardly over lights 36, 37 along at least one side 85, 86 of lighting assembly 10 when installed in channel 11 described above or in protective encasements 40, 48 described hereinafter. Preferably, however, opaque filter 83 is separately made and affixed to base 20 along at least a length of at least one of lights 36, 37 to prevent light from passing through filter 83. Though opaque filter 83 is preferably affixed to base 20, opaque filter 83 may be inserted along side of one or all of bulbs 13, 17 adjacent the side 85, 86 of lighting assembly 10 to be blocked and may also have a reflective surface 84 on the side thereof disposed toward bulbs 13, 17 to prevent absorption of light into filter 83 thus assisting in directing the maximum light generated by bulb 13, 17 in the desired direction. Though it is generally desired to have at least one side 85, 86 covered with an opaque filter throughout the length thereof, it is certainly within the scope of this disclosure to cover only a portion of one side 85 or to provide for an opaque filter 83 on a portion of remaining side 86. Thus, by utilizing a separate opaque filter for affixing to or inserting within protective cover 11, at least a portion of sides 26, 27 of channel 11 may be covered as desired by the fisherperson. Furthermore, in the alternate embodiment hereinafter described, where protective channel 11 is inverted over lighting assembly 10, it may be desired to have light emanating through only one face whereby another of sides 25, 26, 27 may have opaque filter 83 associated therewith leaving only one of sides 25, 26, 27 transparent. Coupled with the mounting of lighting assembly 10 of fishing lighting system 100 on gunwale 51, opaque filter 83 prevents light emanating from fishing lighting system 100 from shining in the face of fisherpersons utilizing fishing lighting system 100, first because fishing lighting system 100 is mounted on gunwale 51 to shine outwardly therefrom and secondly because opaque filter 83 prevents light from shining therethrough.

In an alternate embodiment, lighting assembly 10 comprises a separate base 20 affixed to edge channel 56 of boat 50, however, when so made, the components of lighting assembly 10 are yet exposed to the elements. In this embodiment lighting, assembly 10 is covered with a protective cover such as channel 11, channel 11 having a generally rectilinear configuration with a closed top 25, opposing sides 26, 27 and an open side 44 wherein these sides 25–27 and 44 define an opening 19 therebetween. Opening 19 is of sufficient height and width to accommodate lighting assembly 10 therein and to allow protective channel 11 to provide protection thereto. Protective channel 11 has channel flanges 18 extending outwardly from each of sides 26, 27 at the lower extremity thereof, channel flanges 18 each adapted for fitting within a corresponding groove in edge channel 56, channel flanges 18 being snap-fitted therein. In FIG. 3, channel flanges 18 are shown at right angles to sides 25, 27, however, it is fully understood that channel flanges 18 may be another configuration to properly mate to edge channel 56 on gunwale 51. A sealing gasket (not shown) may be provided alongside base 20 wherein the sealing gasket is contacted by channel flanges 18 at installation of protective channel 11 over base 20 and into edge channel 56. Once base 20 has been affixed within edge channel 56 having the gasket extend therefrom and protective channel 11 is snap fitted within edge channel 56, a sealing plug 12 is inserted into ends 28 of protective channel 11, plugs 12 adapted for sealing contact with the inside surfaces 46, 73, 74 of protective channel 11 and surface 75 of base 20. Thus, lighting assembly 10 is protected from the elements, and as protective channel 11 covers the components of lighting assembly 10, lighting assembly 10 is additionally protected from damage by external forces acting upon boat 50. An end of protective strip 60 may be shaped to be inserted directly into opening 19 and thus be utilized as plug 12 thus making protective channel 11 and protective strip 60 a contiguous protective strip all along gunwale edge 55. Though protective channel 11 is shown as a rectilinear channel, other configurations are possible within the scope of this disclosure.

In this alternate embodiment, it is desired that closed side 25 of protective cover 11 be made transparent or translucent such that light from lights 36, 37 may freely pass therethrough and illuminate the area being fished. One of sides 26, 27 may also be transparent or translucent wherein this transparent or translucent side 26, 27 would normally be directed downwardly from gunwale 51 to attract fish toward boat 50 or to provide white light when landing a fish alongside boat 50 while the opaque side 27, 26 would be facing upwardly from gunwale 51 thus preventing light from lighting assembly 10 from shining toward the fisherperson. Alternately, protective cover 11 may be made of all transparent or translucent material and have opaque filter 83, such as opaque filter 83 shown partially covering ultraviolet light 36 in FIG. 2, opaque filter 83 affixed to opposite side 27 either on the external surface 82 or the internal surface 73 thereof for rendering side 27 opaque while permitting light to pass through one side 26 and closed side 25. It is readily apparent here that opposite side 27 has been chosen to face upwardly but as channel 11 is symmetrical about a central longitudinal axis, side 26 may alternately be chosen as the upwardly facing side having the opaque filter 83 associated therewith. Though opaque filter 83 may be affixed to channel 11, opaque filter 83 may also extend upwardly from base 20 of lighting assembly 10 as shown in FIG. 2 covering a portion of one light 36, light 37 from control 16 to one end 81. Thus, as base 25 is translucent, opaque filter 83 formed along with base 20 and disposed upwardly over lights 36, 37 along at least one side 85, 86 thereof permits light to pass through only face 25 although another of sides 26, 27 may have opaque filter 83 removed therefrom allowing light to pass through at least two sides 25, 26, 27. Though it is generally desired to have at least one side 26, 27 covered with an opaque filter 83 throughout the length thereof, it is certainly within the scope of this disclosure to cover only a portion thereof or to provide for an opaque filter 83 on a portion of a remaining side 25, 26 27. Thus, by utilizing a separate opaque filter 83 for affixing to or inserting within protective cover 11, at least a portion of sides 25, 26, 27 may be covered as desired by the fisherperson.

Alternately, protective channel 11 may be made entirely of opaque material and have lighting assembly 10 mounted on an inside surface 46 of closed side 25 wherein closed side 25 is used as base 20. In this alternative embodiment, protective channel 11 is mounted to edge channel 56 having open side 44 extending outwardly from gunwale edge 55 with lights 36, 37 and control carrier 15 contained within opening 19. Screw holes 35 would then be disposed through closed side 25 with screws 34 passed therethrough for mounting protective channel 11 to edge channel 56. As with the preferred embodiment hereinbefore described, in this alternate embodiment, a transparent or translucent cover 30 need be provided for open side 44, transparent or translucent cover 30 shown in FIG. 4. Though in this alternate embodiment the description has recited that protective channel 11 is opaque and cover 30 is transparent or translucent, portions of or all of protective channel 11 could be transparent or translucent in order to project light from lighting assembly 10 through the transparent or translucent portion thereof. Closed side 25 may also have flanges similar to flanges 18 extending therefrom to slide into grooves in edge channel 56 on gunwale 51.

Figure 5:
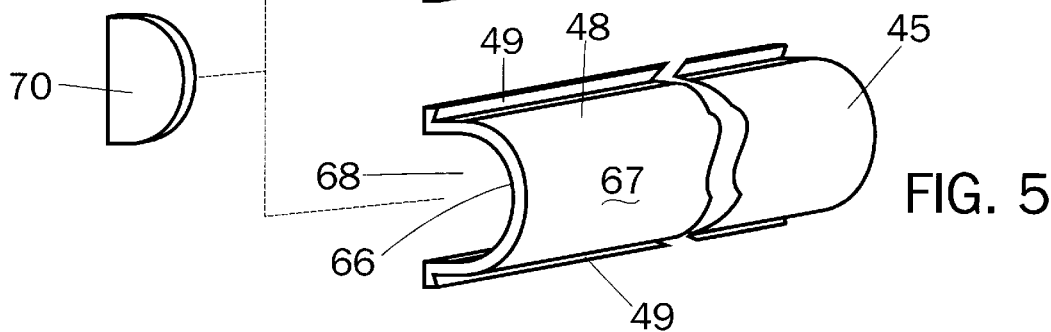
FIG. 5 is a right top frontal perspective view of an alternate protective channel adapted for mounting the fishing lighting system of the preferred embodiment of FIG. 2 upon a fishing craft.

In another alternate embodiment as shown in FIG. 5, protective channel 11 of FIG. 3 may be replaced with a rounded protective channel 48 having channel flanges 49 wherein channel flanges 49 are adapted to fit within and be removably engaged with corresponding channel edges of edge channel 56. Rounded protective channel 48 is preferably made of transparent or translucent material to permit light from lighting assembly 10 to pass therethrough toward the area being fished, however, rounded protective channel 48 may also be fitted with opaque filter 83 or light shield over part of the inside surface 66 or outside surface 67 thereof to provide for directing the rays of light from white light 37 or ultraviolet light 36 as desired by the fisherperson. Rounded protective channel 48 has an opening 68 sized to receive lighting assembly 10 therein wherein lighting assembly 10 is fully encompassed in opening 68 and protected by rounded protective channel 48. Opening 68 of rounded protective channel 48 is also preferably sealed from the elements at both ends thereof by a plug 70 shaped to fit within and be sealing engaged with opening 68, however the cut end of protective strip 60 may be shaped to fit within opening 68 and be sealing engaged therewith to provide sealing in the same manner as is accomplished with plug 70.

Figure 6:
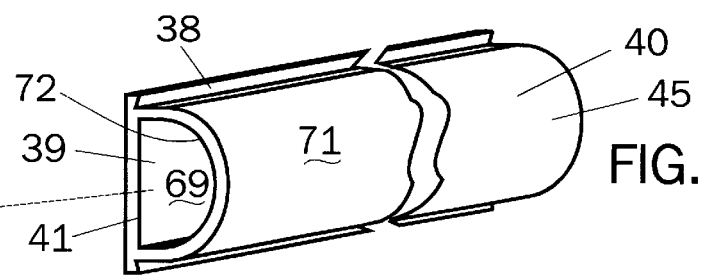
FIG. 6 is a right top frontal perspective view of an alternate protective closed tube adapted for mounting the fishing lighting system of the preferred embodiment of FIG. 2 upon a fishing craft.

In yet another alternate embodiment, a closed rounded protective encasement generally shown in FIG. 6 by the numeral 40 may be utilized in place of protective channel 11. Protective encasement 40 has an opening 39 sized to receive lighting assembly 10 therein wherein base 20 lies upon inside surface 69 of tube base 41. Base 20 may be secured to inside surface 69 by means known in the art, however, as end plug 70 will be received in opening 39 and sealingly affixed thereto, base 20 will be held rigidly within opening 39. As with rounded protective channel 48 of FIG. 5, rounded protective encasement 40 of FIG. 6 has channel flanges 38 adapted for engagement within corresponding channel flanges of edge channel 56 and as rounded protective encasement 40 fully encompasses lighting assembly 10 in opening 39, lighting assembly 10 is protected by rounded protective encasement 40 and thus comprises an extension of protective strip 60. Rounded side 45 of rounded protective encasement 40 is preferably transparent or translucent in order to permit light from lights 36, 37 to pass therethrough. A portion of rounded side 45 of rounded protective encasement 40 may be fitted with opaque filter 83 on either inside surface 72 or outside surface 71 thereof for blocking light in those directions desired by the fisherperson while permitting light to pass through the transparent or translucent portions. Furthermore, as may be used in the preferred embodiment, opaque filter 83 may be affixed to base 20 along the portion of bulb 13 and/or 17 desired to be covered, filter 83 deflected inwardly toward bulb 13, 17 when base 20 having components 13–17 and 83 affixed thereto is inserted into opening 39.

A sealant may be used along with plug 12, 70 or the end of protective strip 60 in order to provide for a more positive seal between plug 12, 72 or protective strip 60 and protective channel 11, 40 or 48, however, plug 12 is preferably made to sealingly engage against all inside surface 46, 73, 74 of protective channel 11 and top side surface 75 of base 20 or plug 72 is made to sealing engage against all inside surfaces 72, 66 and top side 75 of base 20 without a sealant such that lighting assembly 10 may be removed from edge channel 56 for maintenance thereof, particularly the changing of bulbs 36, 37 when necessary. Therefore, lighting assembly 10 may have protective channel 11 removably engaged from edge channel 56 by squeezing sides 26, 27 until protective channel 11 is disengaged from the corresponding channel slots in edge channel 56. Likewise, in the embodiment of FIG. 3, lighting assembly 10 may have cover 30 removably engaged from protective channel 11 by either sliding cover 30 lengthwise along protective channel 11 until cover 30 is disengaged therefrom or by squeezing side edges 26, 27 of protective channel 11 and rolling engaging lip 32 from engagement with channel flange 18. In the alternate embodiments of FIGS. 5 and 6, access to bulbs 36, 37 may be provided by squeezing the lower portions of rounded side 45 at or near edge flanges 49, 38 respectively until rounded protective encasement 40 or rounded protective channel 48 is disengaged from the corresponding channel slots in edge channel 56. For the embodiment of FIG. 6, maintenance of lighting assembly 10 may be accomplished by sliding lighting assembly 10 lengthwise from rounded protective encasement 40 and then reassembled in the reverse manner for reinstallation in edge channel 56.

Figure 7:
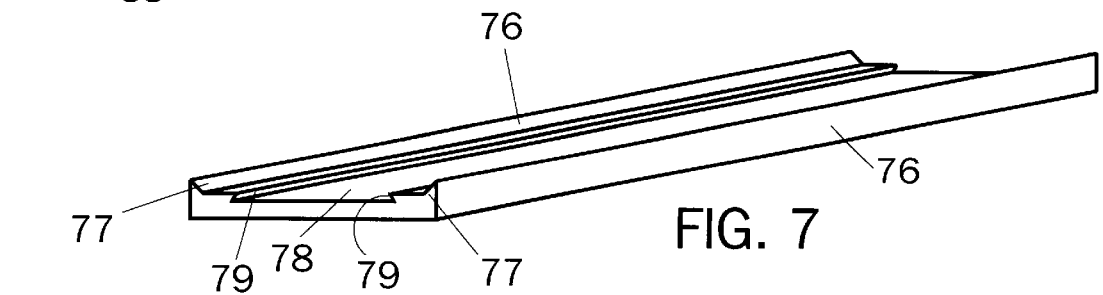
FIG. 7 is a top perspective view of an adapter channel for use in mounting the preferred fishing lighting system of FIG. 1 to a fishing boat having an edge channel of wider width.

Referring now to FIG. 7, an adapter channel 76 is shown for mounting lighting assembly 10 to an wide edge channel 56 of a fishing boat 50. Adapter channel 76 comprises an elongated substantially flat strip of material having groove engaging edges 77 and a central channel 78 for receiving lighting assembly 10 therein. Channel 78 has corresponding grooves 79 on opposite sides thereof for receiving channel flange 18 of FIG. 3, tube flange 38 of FIG. 6 and rounded protective channel flange 49 of FIG. 5 such that these flanges may be removably engaged therein. Groove engaging edges 77 of adapter channel 76 are adapted to be removably received in tapered grooves at the edges of edge channel 56 of a fishing boat. Thus, fishing lighting system 100 may be utilized on boats having a variety of edge channel 56 sizes. Channel 78 is therefore approximately the same width as the outer extremity dimension of channel flanges 18 of protective channel 11.

In one alternate embodiment as shown in FIG. 8, fishing lighting assembly 100 may comprise separate, integrated lighting assembly units 10' each lighting assembly 10' comprising a base 20, at least one means14 for receiving, at least one light bulb 13, 17 wherein means 14 for receiving is mounted on base 20 with base 20 having an integrated circuit (not shown) and a power source (not shown) associated therewith. Lighting assembly 10' preferably is disposed in a protective encasement 40, 48 of FIGS. 5 and 6 wherein protective encasements 40, 48 have protruding flanges 49 and 38 respectively snap-fitted into companion grooves in base member channel 56 of protective strip 60 of gunwale 51, protective encasement 40, 48 thereby protecting means 14 for receiving, bulb 13, 17, base 20, the associated integrated circuit and the power source (where installed as part of lighting assembly). Base 20 of integrated lighting assembly unit 10' may also be affixed directly to base channel 56 of on gunwale 51 and have closed channel 11 disposed thereover with protruding flanges 18 of closed channel 11 snap-fitted into the mating grooves of base channel 56 whereby plugs 12 are then inserted into ends 27, 28 of channel 11 sealing closed channel 11 to base channel 56. In another alternative embodiment, integrated lighting assembly unit 10' may comprise base 20, means 14 for receiving, bulbs 13, 17 wherein base 17 is disposed in open faced channel 11 of FIG. 3, base 20 further having an integrated circuit board (not shown) and power source (not shown) associated therewith. In this alternative embodiment, channel 11 is covered with a cover element 30 shown in FIG. 4 and then sealed at ends 27, 28 with a plug 12 after mounting base 20 and channel 11 to base member channel 56 on gunwale 51 and placing cover 30 lockably over open channel 11. Referring again to FIG. 8, each base 20 is adapted to be affixed to base member channel 56 or directly to gunwale 51 using screws 34 through screw holes 35. Furthermore, base 20 of each integral lighting assembly 10' has power distribution conduits disposed throughout the length thereof these power distribution conduits terminating in bayonet connectors 121 on one end 81 of base 20 and receptacles 221, 222 on the opposite end 81 thereof. Thus, a means for joining 120 one lighting assembly 10' to another lighting assembly 10' in an end to end relationship is comprised of bayonet connectors 121 and receptacles 221, 222 such that each integral lighting assembly 10' may have base 20 thereof joined to a base 20 of an adjacent integral lighting assembly 10' creating this alternate embodiment of fishing lighting system 100. Where a power source such as battery 47 is disposed remote from fishing lighting system 100 of this alternate embodiment, electrical leads may be attached directly to bayonet connectors 121 or inserted into receptacles 221, 222 and secured therein to provide power to the onboard integrated circuit and bulb 13, 17. It is further contemplated by the inventor hereof that base 20 is an integrated circuit board having means 14 for receiving mounted thereon and with integral electrical conductors passing therethrough for joining one lighting assembly 10' end to end with at least one other lighting assembly 10' wherein the joined lighting assemblies 10' may be disposed in a single protective encasement 40, 48 or covered by a protective channel 11 disposed thereover in the manner recited above. Means 14 for receiving may also be directly mounted to gunwale 51 or to channel 56 spaced at a distance commensurate with the length of bulb 13 and/or 17 as desired. Thus, fishing lighting system 100 is adapted to be made a part of gunwale 51 during the manufacture of a boat 50 or may be affixed to a boat 50 not having a channel 56 carrying a protective strip 60 therein as may be found on older boats.

Referring again to FIG. 2, lighting assembly 10 may be constructed by providing an elongated thin, narrow sheet of material selected from the group comprising wood, metal and thermoplastic wherein the thin narrow sheet of material is from about one-half inch to about one and one-half inches in width up to about 40 inches in length to form base 20 of lighting assembly 10. Base 20 is provided with at least one mounting screw hole 35 through base 20 from top side 75 to bottom side 43 and preferably has at least one screw hole 35 on each end thereof as well as one approximately midway in the length thereof. Screw holes 35 are adapted to receive a sheet metal screw 34 therethrough for insertion into a hole provided in edge channel 56 and secured thereto. Mounted to base 20 is at least one pair of means 14 for receiving the ends of bulb 13, 17 therein. Means 14 for receiving is a typical fluorescent bulb socket having slots for receiving protruding contacts of bulb 13, 17 therein, however means 14 for receiving may be a bayonet type for receiving one pole of a fluorescent bulb while the opposite pole is received in another means 14 for receiving spaced from the bulb socket adjacent the end of base 20. Additional means 14 for receiving are mounted to base 20 spaced from the bulb sockets adjacent the ends of base 20, each additional means 14 for receiving spaced inwardly along base 20 a distance substantially equal to the length of bulb 13 thereby creating a pair of means 14 for receiving having the receiving slots facing each other. Preferably, bulb 13 is a ultraviolet light bulb approximately one half inch outside diameter and approximately eight inches in length therefore each pair of means 14 for receiving are spaced approximately 8 inches apart along base 20, however bulb 13 may be three quarters inch in diameter and 15 inches in length wherein each pair of means 14 for receiving are spaced approximately 15 inches apart along base 20 or may be of a smaller diameter and/or of shorter length. Each pair comprising spaced apart means 14 for receiving along with bulb 13 comprises an ultraviolet or "black light" 36 adapted for attracting fish and for observing the location and direction of fluorescent fishing line. Wiring to control 16 may be conventional with one lead becoming a common ground while the other lead is utilized as a hot wire. Preferably, control 16 is mounted approximately centrally along base 20 in control carrier 15. Control 16 may comprise switches and rheostats for individually controlling lights 36, 37 wherein the switches may be operated through a flexible membrane disposed in cover 30 or one of sides 25–27. Wiring leads 21, 22 extend from control 16 through top face 75 of base 20 and exit rear face 43 thereof and are disposed alongside rear face 43 adjacent an inside surface of edge channel 56. Wiring leads 21, 22 extend from lighting assembly 10 behind protective strip 60 to a position adjacent center 65 of stern 64 where leads 21, 22 exit edge channel 56 and enter hull 57 for attachment to an energy source such as battery 47. Battery 47 may have a rheostat associated therewith for controlling the brightness of fishing lighting system 100 and may further have a circuit breaker associated therewith for interrupting the circuit to fishing lighting system 100 in case of malfunction. Mounted alongside control carrier 15 is at least one other means 14 for receiving, means 14 for receiving adapted for receiving an end of a bulb 17 therein. As hereinbefore stated, means 14 for receiving may be an incandescent socket for receiving an incandescent bulb therein however means 14 for receiving preferably is a fluorescent bulb socket and has a fluorescent bulb installed therein. Thus, lighting assembly 10 for fishing lighting system 100 comprises base 20, at least one bulb socket for means 14 for receiving, at least one light bulb 13, 17, wherein the bulb socket is mounted on base 20 and wherein base 20 has an integrated circuit and a power source associated therewith, lighting assembly 10 thereafter having cover 30, 40, 48 protecting the bulb sockets and bulbs 13, 17. Base 20 may be a separate component having means 14 mounted thereon, however, it is within the scope of this invention for base 20 to comprise a portion of gunwale 51 of boat 50. Means 14 for receiving and bulb 17 comprise a white light 37 used also for attracting fish and additionally for docking boat 50 or landing a hooked fish. Alternately, control 16 may be mounted externally of lighting assembly 10 with leads 21, 22 extending along channel 56 through top face 75 of base 20 connecting directly to bulbs 13, 17. Alternately, base 20 may comprise a circuit board having all wiring components, control carrier 15, means 14 for receiving and incandescent socket (where used) made integral therewith wherein only insertion of bulbs 13, 17 and batteries (where self contained) are necessary to make lighting assembly 10 ready for use.

Protective channel 11 of this invention is preferably formed from a thermoplastic material such as polycarbonate, polypropylene, polyethylene, polyvinyl chloride, vinyl, polyamide, polyparabenzamide, fiberglass, polytetrafluoroethylene, polystyrene, epoxy, acrylic, vinyl ester, methylnethacrylate, isophthalic polyester, terephthalic polyester, orthophthalic polyester, dicyclopentadiene, urethane and silicone or blends of the above, however, other materials may also be utilized. A substantially rigid thermoplastic material such as polycarbonate is preferred as polycarbonate has high impact resistance which can withstand the forces present in docking a boat. Polycarbonate is also substantially clear though colorants may easily be mixed therein to provide for an opaque material. Protective channel 11 is generally extruded from one of the above materials utilizing a thermoplastics extruder. When extruding protective channel 11 from polycarbonate, a combination die fed by dual extrusion screws is used to make closed side 25 and one of upright sides 26, 27 of clear polycarbonate while and the other of upright sides 27, 26 is made from an opaque polycarbonate wherein the opaque polyearbonate has had a colorant mixed therein prior to extrusion. The methods of forming combination extrusions is well known in the art and the details thereof need not be recited here. Channel flange 18 is formed by the extrusion die at the same time as upright sides 26, 27 are formed, therefore channel flange 18 is generally of the same material as the upright flange 26, 27 from which it protrudes though channel flange 18 may also be made of a different color polycarbonate by feeding the combination die with another extruder screw. A length of the extrusion in the shape of protective channel 11 may then be cut to a desired length, preferably slightly longer than lighting assembly 10 such that lighting assembly 10 may be fully contained within opening 19.

Protective channel 11 may also be formed from flat, elongated sections of thermoplastic material wherein a channel flange 18 is chemically adhered to each upright edge 26 and 27 and upright edge 26, 27 are chemically adhered to closed side 25. A solvent welding technique, including by not limited to gluing, is generally utilized to chemically adhere thermoplastic materials together, the details of which are well known in the art and need not be repeated here. Lighting assembly 10 may then be secured to gunwale edge channel 56 and protective cover 11 snap fitted into the corresponding grooves of edge channel 56 substantially centered over lighting assembly 10. End plug 12 is then inserted into opening 68 on both ends of protective channel 11 wherein end plug 12 is in full contact with inside surfaces 46, 73, 74 and an exposed surface of edge channel 56 thereby sealing each end of protective channel 11.

In the preferred embodiment utilizing lens cover 30, the components of lighting assembly 10 are first affixed to inside surface 46 of protective channel 11 and protective channel 11 is thereafter secured to edge channel 56. Lens cover 30 is then snap fitted or disposed longitudinally over channel flanges 18 with end plug 12 thereafter being placed in opening 19 in each end of protective channel 11 sealing the ends 28 thereof Referring now to FIG. 5, rounded protective channel 48 is formed by extrusion from a correspondingly shaped die wherein edge flanges 49 are formed integral with and extending from rounded side 45. A thermoplastic material such as polycarbonate, polypropylene, polyethylene, polyvinyl chloride, vinyl, polyamide, polyparabenzamide, fiberglass, polytetrafluoroethylene, polystyrene, epoxy, acrylic, vinyl ester, methylmethacrylate, isophthalic polyester, terephthalic polyester, orthophthalic polyester, dicyclopentadiene, urethane and silicone or blends as well as other similar materials may be extruded into the shape defined by rounded protective channel 48. A substantially rigid thermoplastic material such as polycarbonate is preferred as polycarbonate has high impact resistance which can withstand the forces present in docking a boat. Lengths of rounded protective channel 48 may then be cut from the longer extrusion, these lengths at least the length of base 20 such that lighting assembly 10 may be fully contained within the confines of opening 68. Lighting assembly 10 may then be secured to gunwale edge channel 56 and rounded protective cover 48 snap fitted into the corresponding grooves of edge channel 56 substantially centered over lighting assembly 10. End plug 70 is then inserted into opening 68 wherein end plug 70 is in full contact with inside surface 66 and edge channel 56 thereby sealing each end of rounded protective channel 48 thus creating fishing lighting system 100.

Referring now to FIG. 6, protective encasement 40 is formed by extrusion from a correspondingly shaped die wherein edge flanges 38 are formed integral with and extending from tube base 41 projecting away from rounded side 45. A thermoplastic material such as polycarbonate, polypropylene, polyethylene, polyvinyl chloride, vinyl, polyamide, polyparabenzamide, fiberglass, polytetrafluoroethylene, polystyrene, epoxy, acrylic, vinyl ester, methylmethacrylate, isophthalic polyester, terephthalic polyester, orthophthalic polyester, dicyclopentadiene, urethane and silicone or blends as well as other similar materials is extruded into the shape defined by protective encasement 40. A substantially rigid thermoplastic material such as polycarbonate is preferred as polycarbonate has high impact resistance which can withstand the forces present in docking a boat. Lengths of protective encasement 40 may then be cut from the longer extrusion, these lengths at least the length of base 20 such that lighting assembly 10 may be inserted lengthwise therethrough and fully contained within the confines of opening 39. Plug 70 is then inserted into opening 39 in each end of protective encasement 40 with end plug 73 in full contact with inside surface 72 of rounded side 45 and flat surface 69 of tube base 41 thereby sealing each end of protective encasement 40. Tube flanges 38 may then be snap fitted into the corresponding grooves of edge channel 56 thereby securing lighting assembly 10 to edge channel 56.

Although lighting assembly 10 preferably has tubular fluorescent light bulbs for bulbs 13, 17, bulbs 13, 17 may also be an elongated linear diffuse light source as is fully described in U.S. Pat. No. 4,954,931 incorporated into this application by this reference hereto. The linear diffuse light source may be mounted directly to base 20 in a manner similar to the mounting of bulbs 13, 17 with electrical leads 21, 22 connecting the linear diffuse light source to a power source. As is used in U.S. Pat. No. 4,954,931, light emitting diodes may be used for light sources 13, 17 or alternately, light may be transmitted to the linear diffuse light source through a fiber optic cable from another location on boat 50 in a manner similar to the perimeter lighting shown in U.S. Pat. 4,947,293 or the perimeter lighting shown in U.S. Pat. No. 5,495,401, both references also incorporated herein by this reference thereto wherein the fiber optic cable used is not frosted along any portion of the length thereof but merely transmits light to linear diffuse light source utilized as bulb 13 and/or 17 though the fiber optic cable may be frosted along at least one portion of the length thereof to provide for lighting assembly 10 at a distinct location along gunwale 51 of boat 50.

In still another embodiment, a portion of opaque filter 83 may actually be an ultraviolet filter wherein only white light bulbs 13 need be utilized in lighting assembly 10, the ultraviolet light portion of opaque filter 83 used to direct black light onto the surface being fished. Still alternately, opaque filter 83 may be an ultraviolet filter which may be shifted within lighting assembly 10 over a white light source thereby permitting only ultraviolet light to be directed toward the area being fished. This embodiment is particularly useful with individual lighting assemblies 10' shown in FIG. 8. For instance, opaque filter 83 permitting ultraviolet light to pass therethrough may be separately disposed into protective channel 11 with a magnetic section made a part thereof or attached thereto adjacent an inside surface 46, 73, 74 of channel 11 wherein a magnet may be used to move opaque filter over a transparent or translucent portion of sides 25, 26 or 27 such that black light flows toward the area being fished while blocking all of the white light emanating from light source 13. Similarly, opaque filter 83 permitting ultraviolet light to pass therethrough may be separately disposed adjacent inside surface 66 of protective channel 48 or inside surface 71 of protective channel 40 wherein a magnet is used to move this opaque filter 83 over a transparent or translucent portion of rounded side 45.

While the present invention has been described with reference to the above described preferred embodiments and alternate embodiments, it should be noted that various other embodiments and modifications may be made without departing from the spirit of the invention. Therefore, the embodiments described herein and the drawings appended hereto are merely illustrative of the features of the invention and should not be construed to be the only variants thereof nor limited thereto.

I claim:

1. A fishing lighting system comprising at least one lighting assembly wherein said at least one said lighting assembly comprises at least one ultraviolet light source, at least one white light source, means for separately controlling said ultraviolet light source and said white light source and a mounting base, said mounting base carrying said at least one ultraviolet light source, said at least one white light source and said means for separately controlling wherein said fishing lighting system is integral with a portion of the gunwale of a boat.

2. A fishing lighting system as in claim 1 wherein said at least one said lighting assembly is associated with a protective strip of said gunwale.

3. A fishing lighting system as in claim 2 wherein said mounting base of said at least one said lighting assembly is attached to a base member channel of said protective strip of said gunwale, said at least one said lighting assembly having a cover fitted thereover.

4. A fishing lighting system as in claim 3 wherein said cover is snap-fitted into companion grooves in a base member of said protective strip of said gunwale over said lighting assembly.

5. A fishing lighting system as in claim 4 wherein said cover has a transparent portion and an opaque portion.

6. A fishing lighting system as in claim 5 wherein said transparent portion directs light emanating from said at least one said lighting assembly substantially downwardly from said gunwale.

7. A fishing lighting system as in claim 5 wherein said transparent portion directs light emanating from said at least one said lighting assembly in a narrow strip directly outwardly from said gunwale.

8. A fishing lighting system as in claim 5 wherein said transparent portion directs light emanating from said at least one said lighting assembly substantially downwardly and in a narrow strip directly outwardly from said gunwale.

9. A fishing lighting system as in claim 5 wherein said transparent portion directs light emanating from said at least one said lighting assembly in a narrow strip directly outwardly from said gunwale.

10. A fishing lighting system as in claim 2 wherein said at least one said lighting assembly is disposed in a protective encasement, said protective encasement having protruding flanges, said protective encasement snap-fitted into companion grooves in a base member channel of said protective strip of said gunwale over said lighting assembly.

11. A fishing lighting system comprising at least one lighting assembly wherein said at least one said lighting assembly comprises at least one ultraviolet light source, at least one white light source and a mounting base wherein said fishing lighting system replaces a section of a base member channel and a protective strip fitted onto said base member channel, said base member channel and said protective strip removed from a gunwale of a boat wherein said fishing lighting system is thereby made integral with a portion of said gunwale of said boat.

12. A fishing lighting system as in claim 11 wherein said fishing lighting system replaces only a minor portion of the length of said base member channel and said protective strip.

13. A fishing lighting system as in claim 12 wherein said minor portion of the length of said base member channel and said protective strip is removed from said gunwale near at least one fishing location of said boat.

14. A fishing lighting system as in claim 12 wherein said minor portion of the length of said base member channel and said protective strip is removed from said gunwale near all fishing locations of said boat.

15. A fishing lighting system as in claim 12 wherein said at least one said lighting assembly is disposed in a protective encasement.

16. A fishing lighting system as in claim 15 wherein said protective encasement is sealingly closed on the opposed ends thereof.

17. A fishing lighting system as in claim 16 wherein said protective encasement is an extension of said protective strip having said opposed ends thereof placed in contiguous relationship with open ends of the remaining portions of said protective strip.

18. A fishing lighting system as in claim 17 wherein said protective encasement has a transparent portion and an opaque portion.

19. A fishing lighting system as in claim 18 wherein said transparent portion directs light emanating from said at least one said lighting assembly substantially downwardly from said gunwale.

* * * * *